Jan. 8, 1946.  D. E. TRUCKSESS  2,392,434
VOLTAGE REGULATOR
Filed Sept. 17, 1943
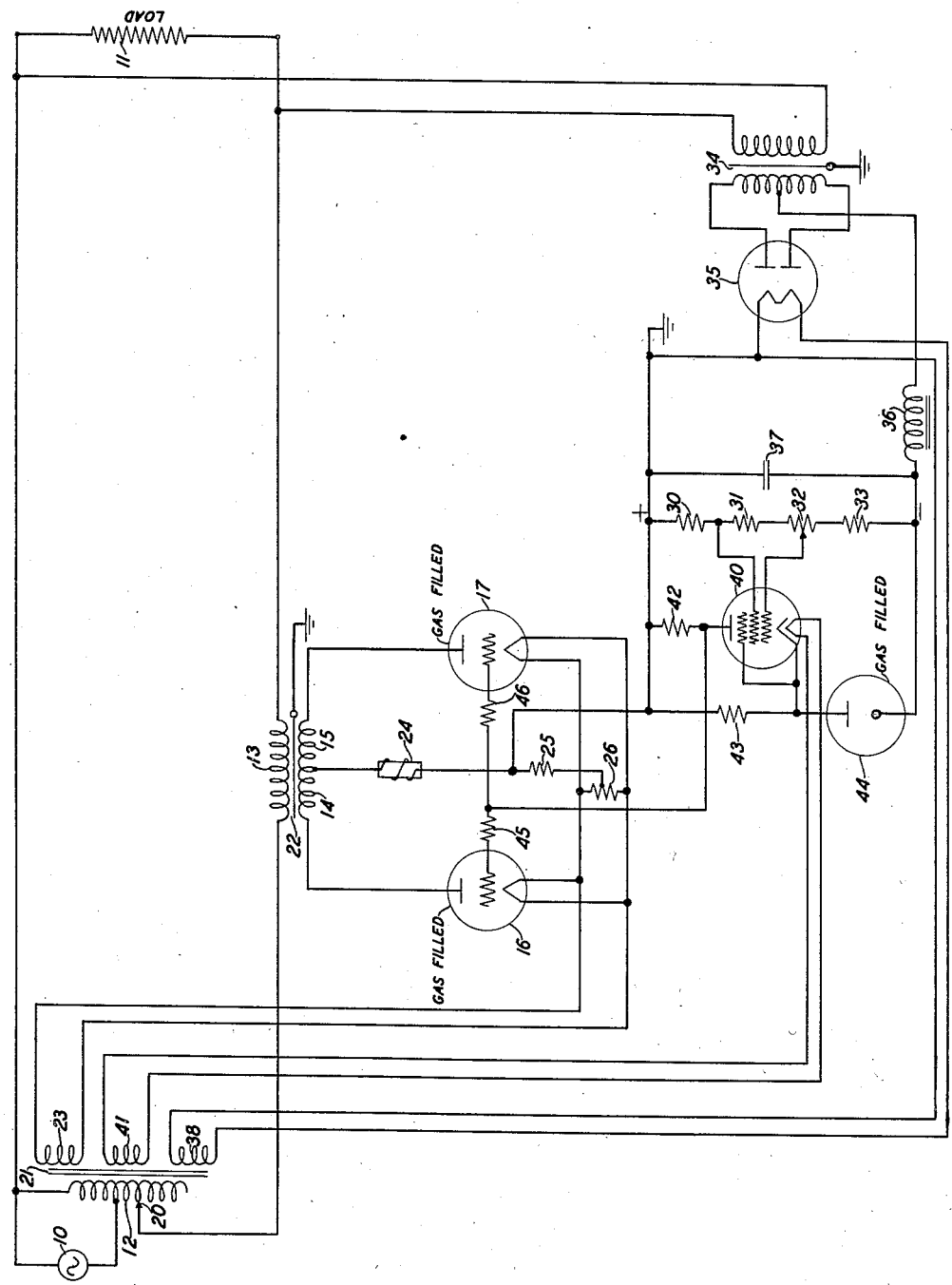
INVENTOR
D. E. TRUCKSESS
BY
*G. F. Heuerman*
ATTORNEY Patented Jan. 8, 1946

2,392,434

UNITED STATES PATENT OFFICE 2,392,434

VOLTAGE REGULATOR

David E. Trucksess, Summit, N. J., assignor to Bell Telephone Laboratories, Incorporated, New York, N. Y., a corporation of New York Application September 17, 1943, Serial No. 502,736

2 Claims. (Cl. 171—242)

This invention relates to electrical control apparatus and particularly to apparatus for regulating the voltage across a load to which current is applied from an alternating current supply source for maintaining the load voltage substantially constant.

An object of the invention is to provide an improved alternating voltage regulator.

Another object is to provide an improved voltage regulator employing electronic means for controlling the current supplied from an alternating current source to a load to maintain the load voltage substantially constant.

In accordance with a specific embodiment of the invention herein shown and described for the purpose of illustration, there are provided for maintaining substantially constant the alternating voltage across a load to which current is supplied from an alternating current supply source a transformer the primary winding of which is connected in series with the load and through the secondary winding of which current is caused to flow due to the voltage induced therein, and electronic means for controlling the current flow through the secondary winding to control the impedance of the primary winding. Two circuits, each comprising an electronic device, are preferably connected across different portions, respectively, of the secondary winding so that there is produced in the core of the transformer due to the current in the secondary winding an alternating magnetomotive force which opposes the alternating flux set up in the core due to the alternating current flowing through the primary winding. The currents in the two secondary circuits, respectively, are controlled by the electronic devices provided in the circuits in response to load voltage changes to minimize or substantially eliminate such changes in load voltage. A rectifying means connected to the load circuit is provided for producing a direct voltage which varies in accordance with changes of the alternating load voltage. The direct voltage thus produced after amplification is utilized for biasing the control electrodes of the electronic devices with respect to their cathodes to control the currents which flow alternately in different portions of the secondary transformer winding. When there are employed vacuum tubes, the anode-cathode paths of which are in the circuits connected to different portions, respectively, of the secondary transformer winding to cause current to flow in opposite directions alternately in the secondary winding, each tube is conducting during alternate half cycles of the supply voltage and the amplitude of the current in each circuit is controlled in accordance with the biasing voltage impressed upon the control electrode-cathode circuits of the tubes. When the maximum current to be supplied to the load is relatively large, however, it is preferable to employ grid controlled, gas-filled electronic devices of the arc discharge type commonly known as "Thyratrons." When employing tubes of this type the average current flowing in each circuit during each cycle of an alternating current source is determined by the biasing voltage impressed upon the control electrode-cathode circuits of the tubes, the average amplitude of each current being a maximum when each tube is conducting for one-half of each cycle of the alternating wave and the average current being a minimum when each tube is conducting during one-fourth of each cycle of the alternating wave. The alternating magnetomotive force produced in the transformer core due to the currents flowing in the circuits, respectively, connected to the secondary winding controls the reluctance of the core and therefore the impedance of the primary winding to maintain the alternating load voltage substantially constant.

The single figure of the drawing to which reference will now be made is a schematic view of a suitable circuit arrangement for supplying alternating current to a load at substantially constant voltage in accordance with the invention.

Referring to the drawing, there is provided for supplying alternating current from a supply source 10 to a load 11 a circuit comprising a winding 12 on a core 21 used as an auto transformer having its primary connected to the source 10 and its secondary connected to a circuit comprising the primary winding 13 of a transformer having a core 22 and load 11 in series, a variable connection 20 to winding 12 being provided to permit the voltage impressed upon the load circuit to be varied. The secondary winding on transformer core 22 has two portions 14 and 15, one portion being between one end terminal and a common mid-terminal and the other portion being between the other end terminal and the mid-terminal. There are provided two gas-filled electronic devices 16 and 17 each having an anode, a cathode and a control electrode. Heating current is supplied to the cathodes of tubes 16 and 17 in parallel from a secondary winding 23 on transformer core 21. The mid-terminal of secondary winding 14, 15 is connected through choke coil 24 and resistor 25 to the mid-tap of a resistor 26, the end terminals of which are connected across each cathode. The choke coil 24 is preferably a so-called "swinging choke" of the type disclosed in an application of A. Majlinger and B. E. Stevens, Serial No. 466,856, filed November 25, 1942. The anodes of tubes 16 and 17 are connected to the end terminals of secondary winding 14, 15, respectively.

There is provided a rectifying circuit for producing across a current path comprising resistors 30, 31 and 33 and potentiometer 32, all connected in series, a direct voltage which varies in accordance with amplitude changes of the alternating load voltage. The rectifying circuit comprises a transformer 34 having its primary winding connected to the load terminals and its secondary winding connected to the anodes of a full wave rectifier tube 35. The output of the rectifier is connected to the current path 30, 31, 32, 33 through a filter comprising inductance element 36 and a condenser 37, the cathode of rectifier tube 35 being connected to a terminal of resistor 30 which is grounded. A mid-tap of the secondary winding of transformer 34 is connected through inductance element 36 to a terminal of resistor 33 and condenser 37 is connected across the current path 30, 31, 32, 33. Heating current is supplied to the cathode of rectifier tube 35 from a secondary transformer winding 38 on core 21. An amplifier comprising electronic device 40 is provided for amplifying the voltage variations across current path 30, 31, 32, 33. The cathode heater of tube 40 is connected to a secondary winding 41 on transformer core 21. The anode of tube 40 is connected through a resistor 42 to the grounded terminal of resistor 30. The screen grid of tube 40 is connected to the common terminal of resistors 30 and 31. The control electrode of tube 40 is connected to the variable tap of potentiometer 32. A current path comprising a resistor 43 and a cold cathode tube 44 in series is connected across the path 30, 31, 32, 33, the voltage drop across tube 44 remaining substantially constant irrespective of the current flowing through it within its operating range. The cathode and the suppressor grid of tube 40 are connected to the common terminal of resistor 43 and cold cathode tube 44. The grounded terminal of resistor 42 is connected to the common terminal of choke coil 24 and resistor 25. The common terminal of the anode of tube 40 and resistor 42 is connected through a resistor 45 to the control electrode of tube 16 and through a resistor 46 to the control electrode of tube 17.

The operation of the regulating circuit for maintaining the load voltage substantially constant is as follows. Alternating current flowing through the primary transformer winding 13 sets up an alternating flux in core 22 to produce an alternating voltage across the secondary winding 14, 15. When the current flowing in winding 13 is in such a direction that the potential of the anode of tube 16 is positive with respect to its cathode, current is caused to flow in a positive direction through a circuit which may be traced from the cathode of tube 16 through resistor 25, choke coil 24 and winding portion 14 to the anode of tube 16. When current flows in the opposite direction through primary winding 13, current is caused to flow in a positive direction through a circuit which may be traced from the cathode of tube 17 through resistor 25, choke coil 24 and winding portion 15 to the anode of tube 17. Thus, the current flowing in secondary winding 14, 15 in opposite directions alternately produces in the core 22 a magnetomotive force which opposes the alternating flux in the core 22 due to the alternating current flowing in winding 13, thereby increasing the reluctance of the core and decreasing the inductance of winding 13. As the average amplitudes of the currents flowing through winding portion 14 and winding portion 15, respectively, increase, the impedance of primary winding 13 decreases, and vice versa.

The cathode of amplifier tube 40 is maintained at a fixed positive potential with respect to the negative output terminal of rectifier 34, 35, 36, 37 and the control grid of tube 40 is positive with respect to the negative output terminal of the rectifier by an amount which varies in accordance with the amplitude variations of the alternating load voltage. Assuming that there is an increase in load voltage, due to an increase in supply voltage or a decrease in load, for example, the control grid of tube 40 will become relatively more positive or less negative with respect to its cathode to increase the anode current flowing through resistor 42. As a result, the control electrodes of tubes 16 and 17 become relatively more negative or less positive with respect to their cathodes to cause the tubes to become conducting later in the half cycles during which the anodes of the tubes, respectively, are positive. The average amplitudes of the currents which flow through winding portions 14 and 15 alternately are therefore decreased to cause the reluctance of core 22 to decrease and the impedance of primary winding 13 to increase. The voltage drop across winding 13 is, therefore, increased to cause the load voltage to be reduced to its normal value. When the load voltage decreases, the control grid of tube 40 becomes relatively more negative or less positive with respect to its cathode and the control grids of tubes 16 and 17 become relatively more positive or less negative with respect to their cathodes to cause the average amplitudes of the currents flowing in the secondary transformer winding 14, 15 to increase, thereby decreasing the impedance of primary winding 13 and causing the load voltage to be increased to its normal value.

The voltage drop produced across resistor 25, due to the anode currents of tubes 16 and 17 flowing therein, assists in the regulation of load voltage. When there is an increase in line voltage, for example, the voltage induced in the secondary winding 14, 15 is increased due to the increased load current flowing in winding 13 and the resulting increased anode currents of tubes 16 and 17 flowing through resistor 25 produce an increased voltage drop across resistor 25. This voltage drop is impressed upon the control electrode-cathode circuits of tubes 16 and 17 to make the control electrodes relatively more negative with respect to the cathodes to oppose the rise in anode-cathode currents. The tendency for the impedance of winding 13 to decrease due to the increased current flowing therein is thus minimized. The main regulating action, however, is due to the grid biasing voltage for tubes 16 and 17 produced across resistor 42, this biasing voltage having variations corresponding to load voltage changes.

Where the supply circuit is to be used to supply current to a load which is varied over a relatively wide range and where the permissible variation in load voltage is relatively small, it has been found desirable to increase the number of effective turns in the auto transformer winding 12 as the load is increased to increase the voltage applied to the load. In some cases it may be preferable to employ electronic devices 16 and 17 which are vacuum tubes, the anode-cathode impedances of which are varied in accordance with the control electrode-cathode biasing potential for controlling the current flowing in the secondary winding 14, 15. In this case the choke coil 24 may be omitted, the connection to the mid-point of winding 14, 15 being connected directly to the terminal of resistor 25.

What is claimed is:

1. In combination with a circuit for supplying current from an alternating current source to a load, of a transformer having a primary winding connected in said circuit in series with said load, said transformer having a secondary winding in which a voltage is induced due to the load current flowing in said primary winding, a circuit connected to said secondary winding including variable impedance means through which current is caused to flow due to the voltage induced in said secondary winding, rectifying means having an input circuit connected across said load and an output circuit across which is set up a direct voltage which varies in accordance with changes of the alternating load voltage, and means responsive to variations of said direct voltage for causing the impedance of said variable impedance means to increase and thereby cause the impedance of said primary winding to increase when the voltage across said load begins to increase.

2. In combination with a circuit for supplying current from an alternating current source to a load, of a transformer having a primary winding connected in said circuit in series with said load, said transformer having a secondary winding in which a voltage is induced due to the load current flowing in said primary winding, a space discharge device having an anode, a cathode and a control electrode, a circuit connected to said secondary winding including the anode-cathode path of said device through which current is caused to flow due to the voltage induced in said secondary winding, rectifying means having an input circuit and an output circuit, means for impressing the alternating load voltage upon said input circuit to cause to be set up across said output circuit a direct voltage which varies in accordance with changes of the alternating load voltage, a bridge circuit having ohmic resistors in three of its arms and in its fourth arm a voltage stabilizing resistance means the resistance of which changes in response to current changes therethrough at such a rate that the voltage drop across said resistance means remains substantially constant, means for connecting the input terminals of said bridge to the output circuit of said rectifying means, an amplifier having its input circuit connected to the output bridge terminals for setting up in the amplifier output circuit a direct voltage having variations corresponding to the variations of the rectifier output voltage, and means for impressing said amplifier output voltage upon a circuit connecting the control electrode and cathode of said space discharge device to change the anode-cathode current of said device in a direction to cause the impedance of said primary winding to increase when the voltage across said load begins to increase.

DAVID E. TRUCKSESS.